United States Patent
Lee et al.

(10) Patent No.: US 10,804,559 B2
(45) Date of Patent: Oct. 13, 2020

(54) PATTERNED SEPARATOR AND BATTERY COMPRISING SAME

(71) Applicant: LG CHEM, LTD., Seoul (KR)

(72) Inventors: Kun Seok Lee, Daejeon (KR); Jungyeon Lee, Daejeon (KR); Seung Heon Lee, Daejeon (KR); Sun Mi Jin, Daejeon (KR); Hyejin Kwon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 187 days.

(21) Appl. No.: 15/779,275

(22) PCT Filed: Dec. 19, 2016

(86) PCT No.: PCT/KR2016/014882
§ 371 (c)(1),
(2) Date: May 25, 2018

(87) PCT Pub. No.: WO2017/105156
PCT Pub. Date: Jun. 22, 2017

(65) Prior Publication Data
US 2018/0351194 A1   Dec. 6, 2018

(30) Foreign Application Priority Data
Dec. 18, 2015  (KR) ........................ 10-2015-0182167

(51) Int. Cl.
*H01M 10/04*   (2006.01)
*H01M 2/16*   (2006.01)
(Continued)

(52) U.S. Cl.
CPC ......... *H01M 10/0459* (2013.01); *H01M 2/14* (2013.01); *H01M 2/16* (2013.01); *H01M 2/168* (2013.01); *H01M 10/0525* (2013.01)

(58) Field of Classification Search
CPC ......... H01M 10/0459; H01M 10/0525; H01M 2/14; H01M 2/168; H01M 2/16
(Continued)

(56) References Cited

U.S. PATENT DOCUMENTS

2013/0084483 A1   4/2013  Lee et al.
2013/0299792 A1*  11/2013  Park .................... H01L 51/5268
257/40

(Continued)

FOREIGN PATENT DOCUMENTS

CN      103450444 A    12/2013
JP      2015-141838 A   8/2015
(Continued)

OTHER PUBLICATIONS

International Search Report for PCT/KR2016/014882 (PCT/ISA/210) dated May 22, 2017.
(Continued)

*Primary Examiner* — Gary D Harris
(74) *Attorney, Agent, or Firm* — Birch, Stewart, Kolasch & Birch, LLP

(57) ABSTRACT

The present application relates to a separator and a battery comprising the same. A separator according to an exemplary embodiment of the present application includes: a porous substrate; and a first bonding layer pattern provided on at least one surface of the porous substrate, in which each pattern constituting the first bonding layer pattern is a pattern including a second bonding layer pattern having an aperture ratio of 5% or more and 40% or less.

9 Claims, 9 Drawing Sheets

(51) Int. Cl.
*H01M 10/0525* (2010.01)
*H01M 2/14* (2006.01)

(58) Field of Classification Search
USPC .......................................................... 429/131
See application file for complete search history.

(56) References Cited

U.S. PATENT DOCUMENTS

2015/0140402 A1   5/2015   Kim et al.
2015/0140403 A1   5/2015   Moon et al.
2015/0228951 A1   8/2015   Yu et al.

FOREIGN PATENT DOCUMENTS

| KR | 10-0363270 B1 | 11/2002 |
| KR | 10-2013-0107296 A | 10/2013 |
| KR | 10-2013-0123744 A | 11/2013 |
| KR | 10-1491061 A | 2/2015 |
| KR | 10-2015-0048082 A | 5/2015 |
| KR | 10-2015-0051901 A | 5/2015 |

OTHER PUBLICATIONS

European Search Report for Appl. No. 16876098.1 dated Aug. 10, 2018.

\* cited by examiner

[Figure 1]
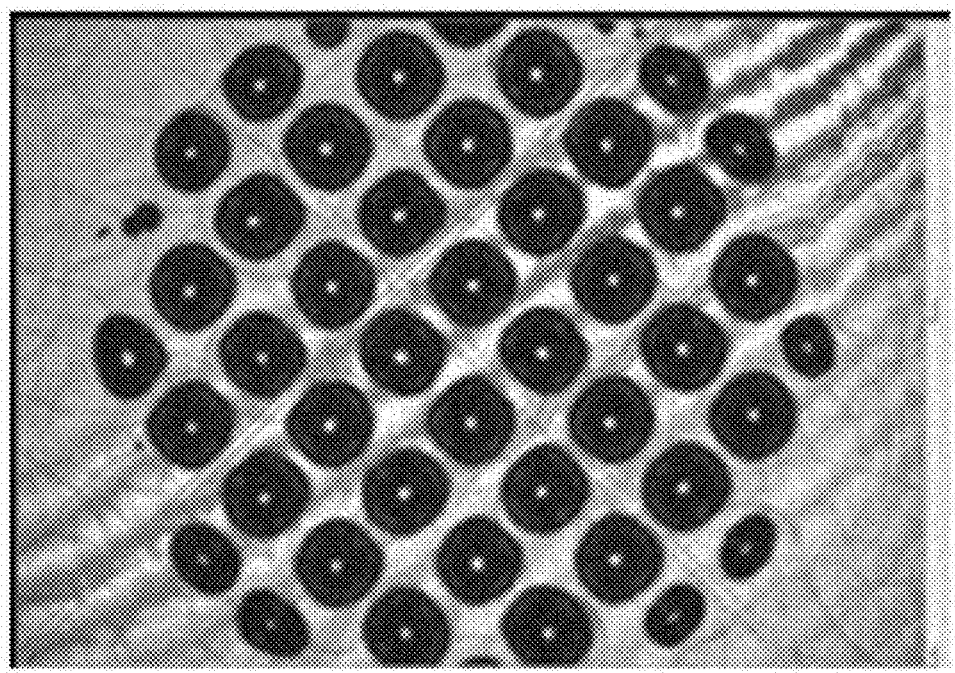
[Figure 2]
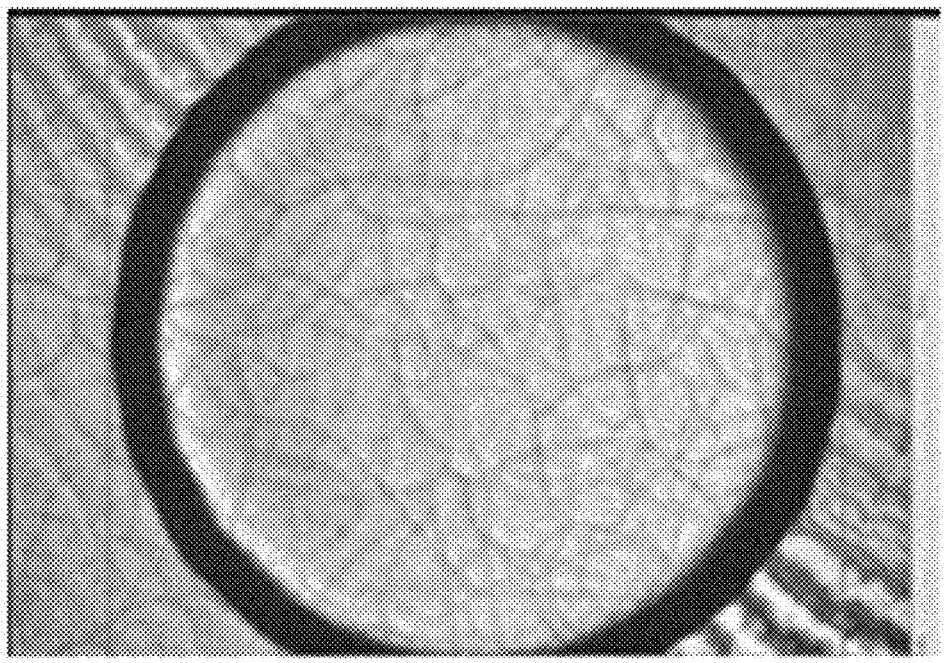

[Figure 3]
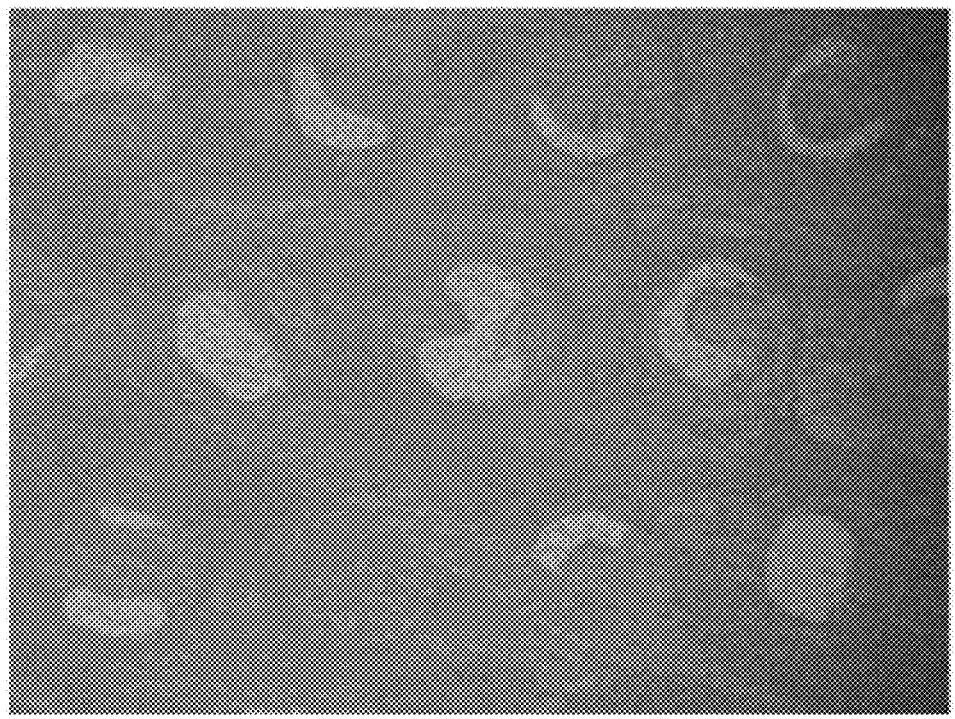
[Figure 4]
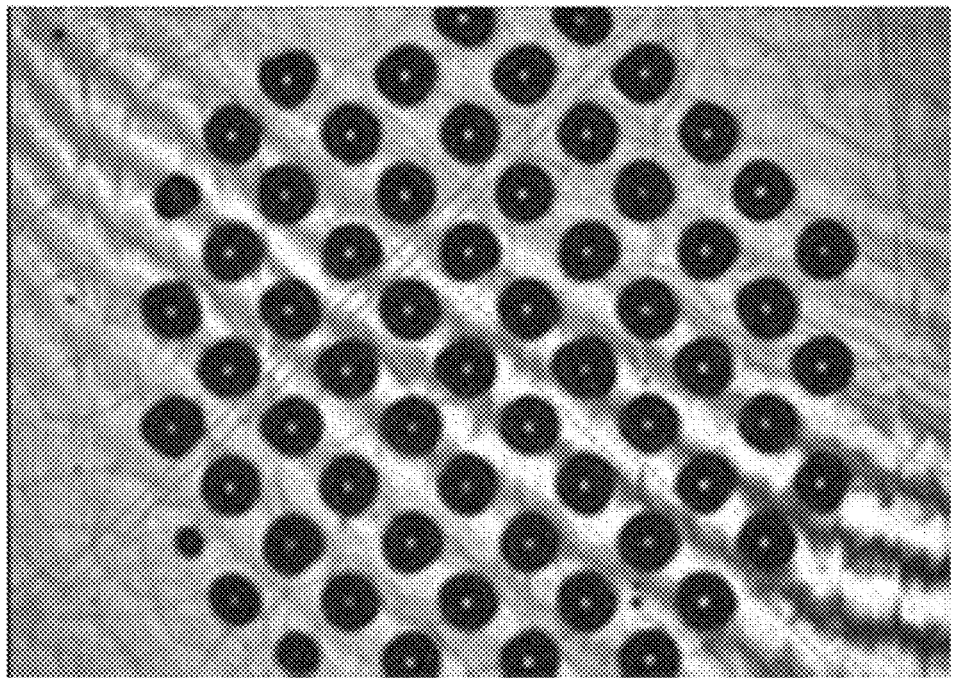

[Figure 5]
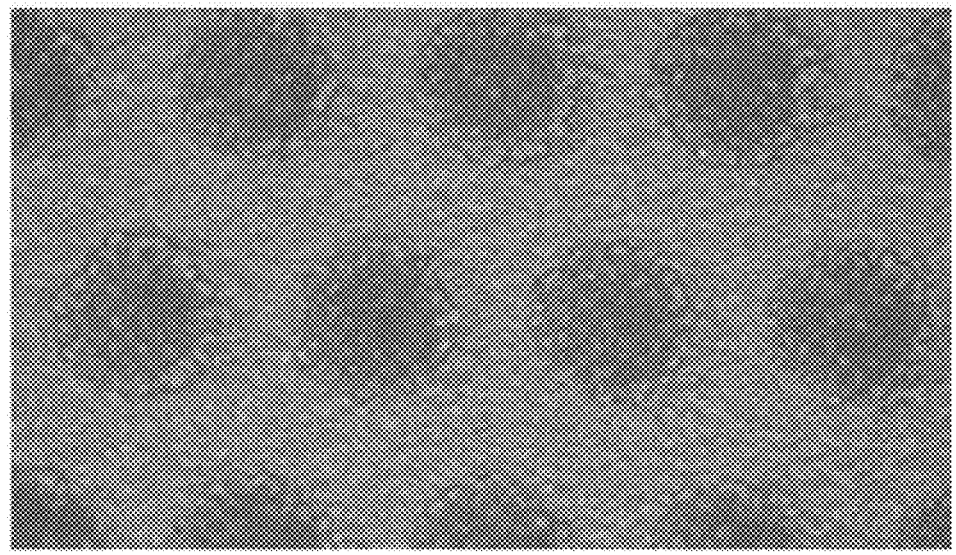
[Figure 6]
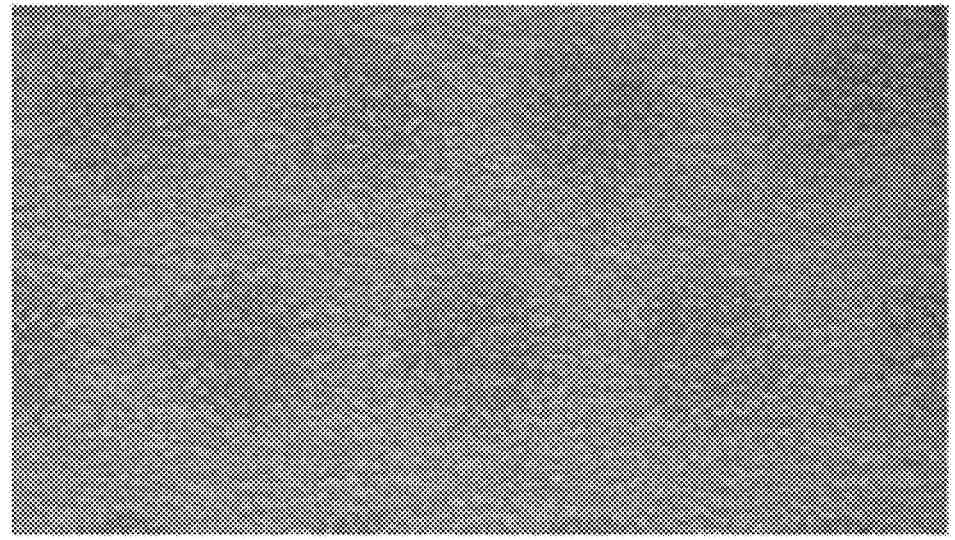

[Figure 7]
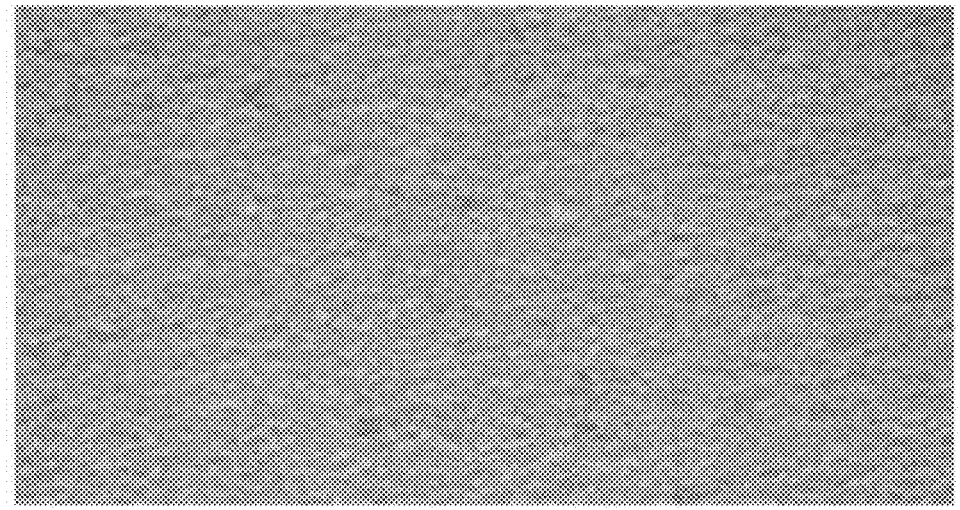
[Figure 8]
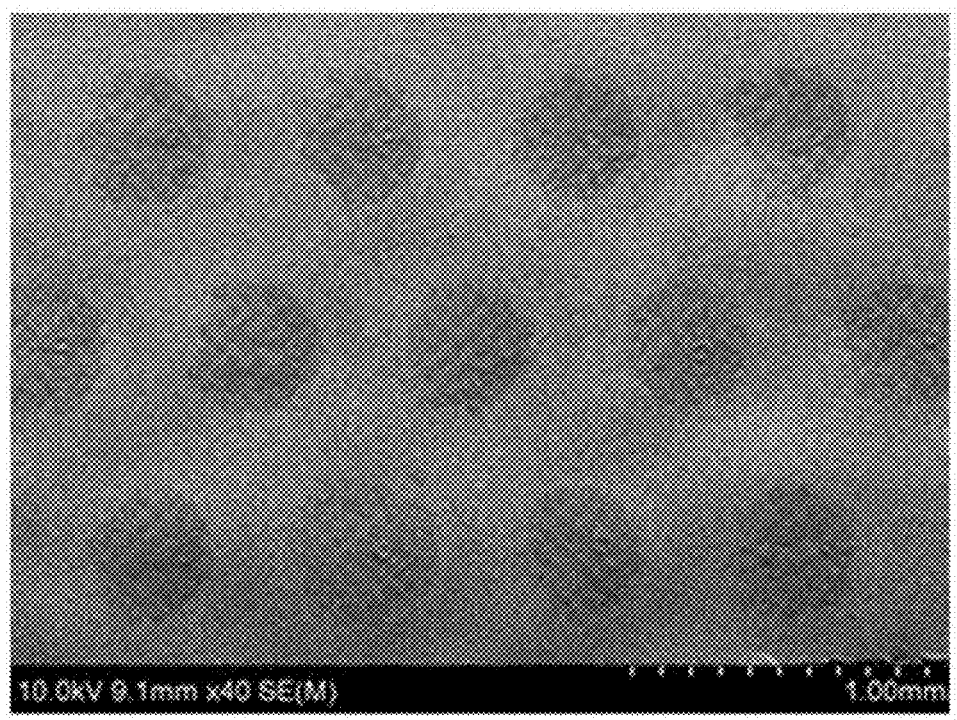

[Figure 9]
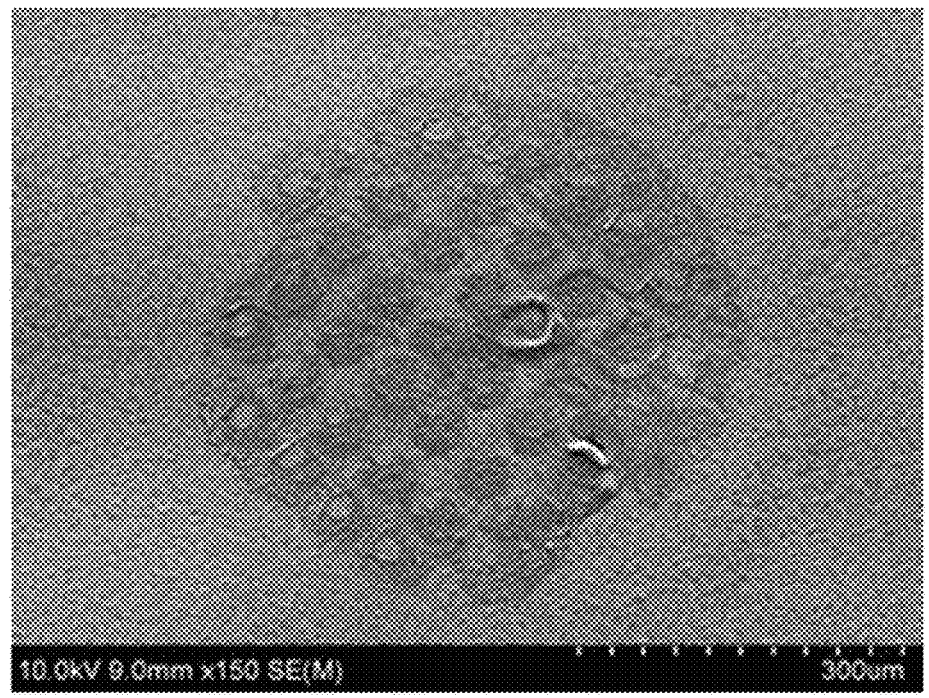
[Figure 10]
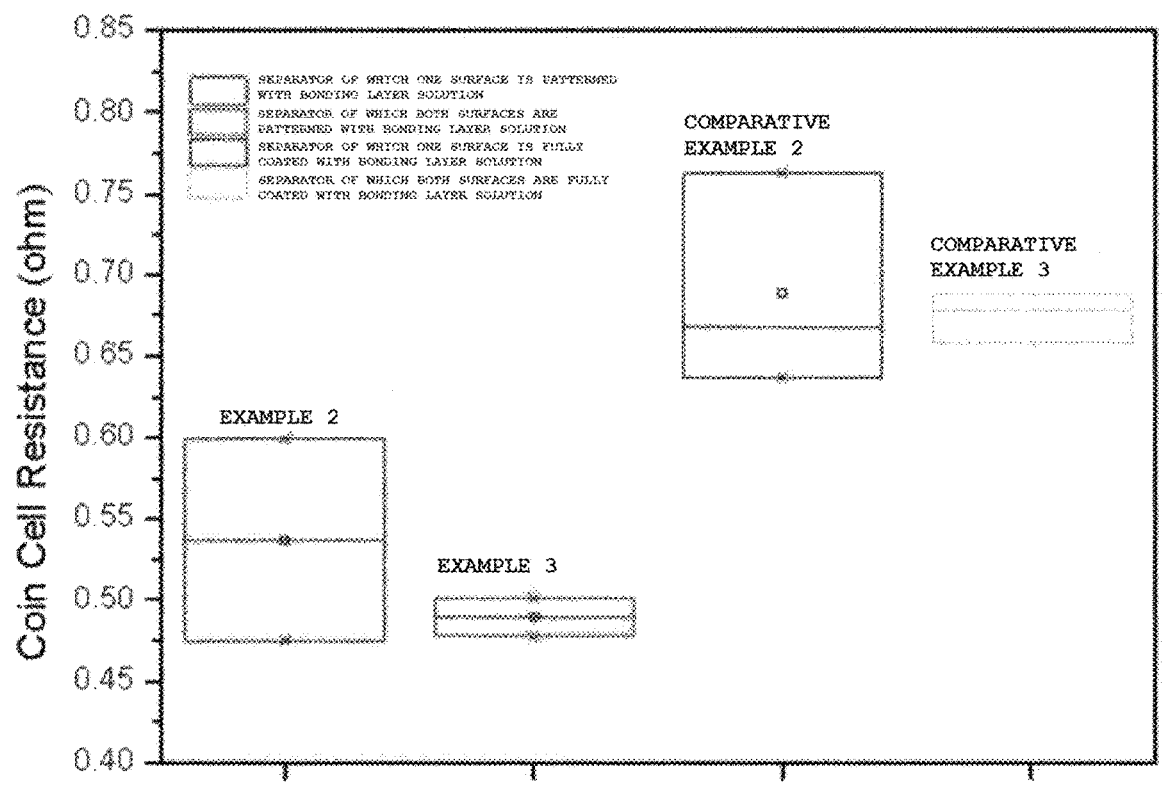

[Figure 11]
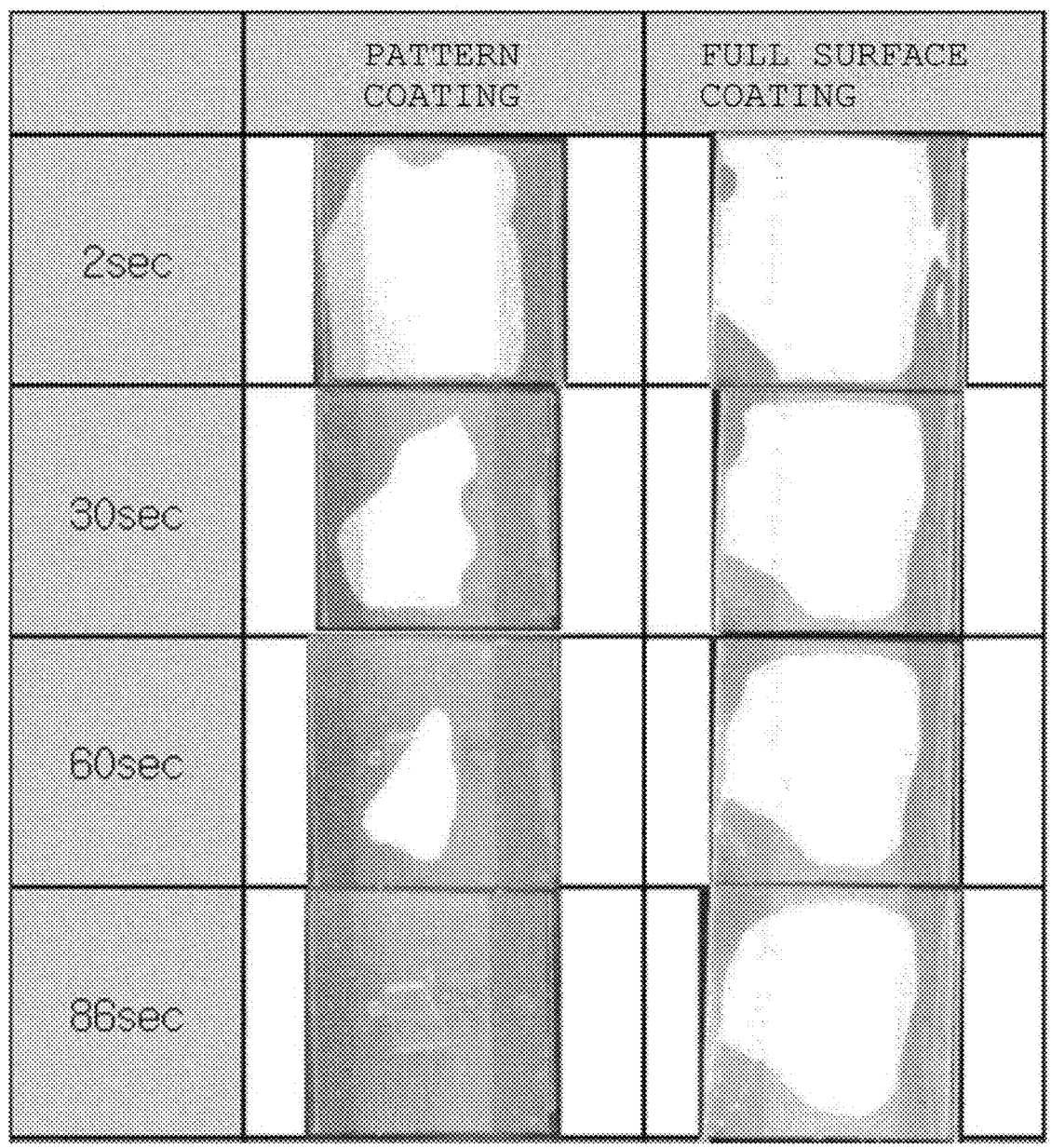

[Figure 12]
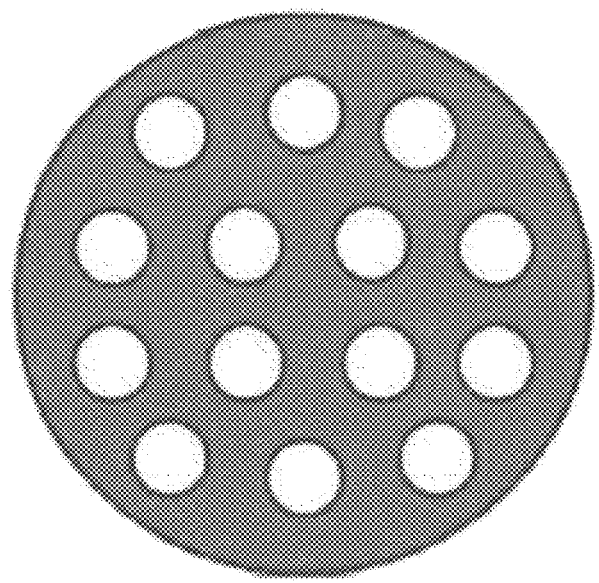
[Figure 13]
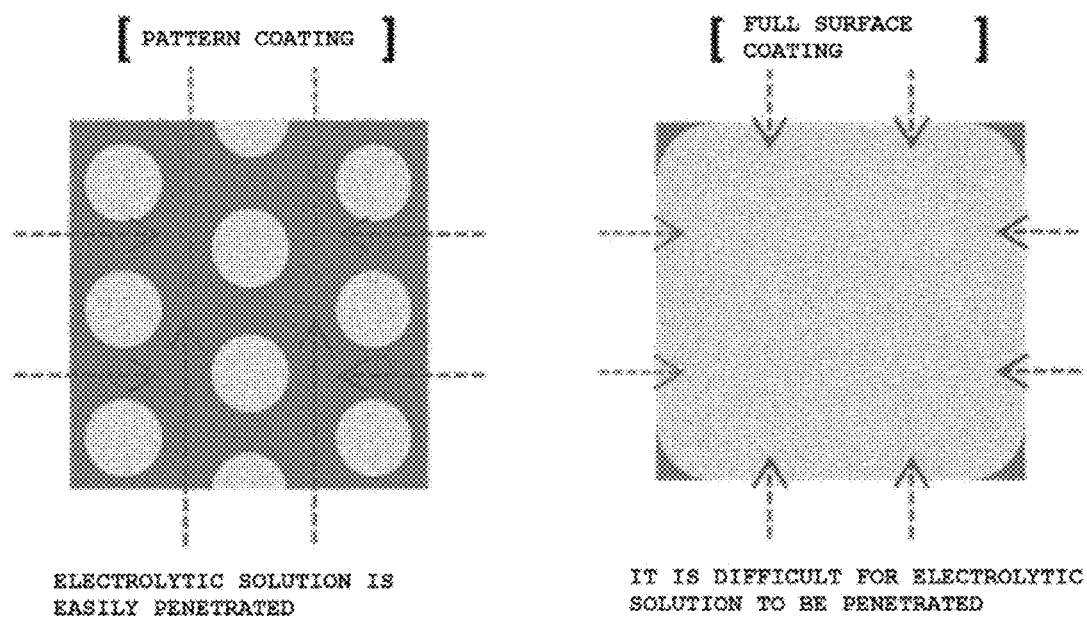

[Figure 14]
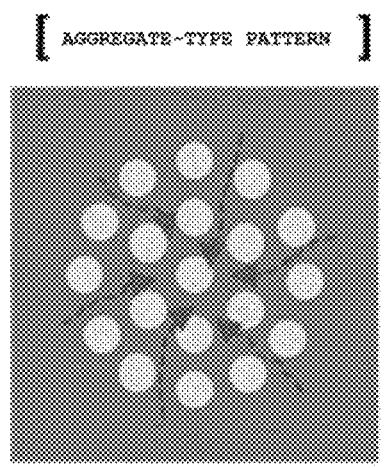
[ AGGREGATE-TYPE PATTERN ]
BINDER IS RAPIDLY SWOLLEN
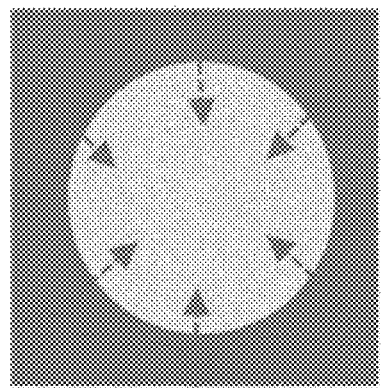
[ SINGLE PATTERN ]
BINDER IS SLOWLY SWOLLEN

[Figure 15]
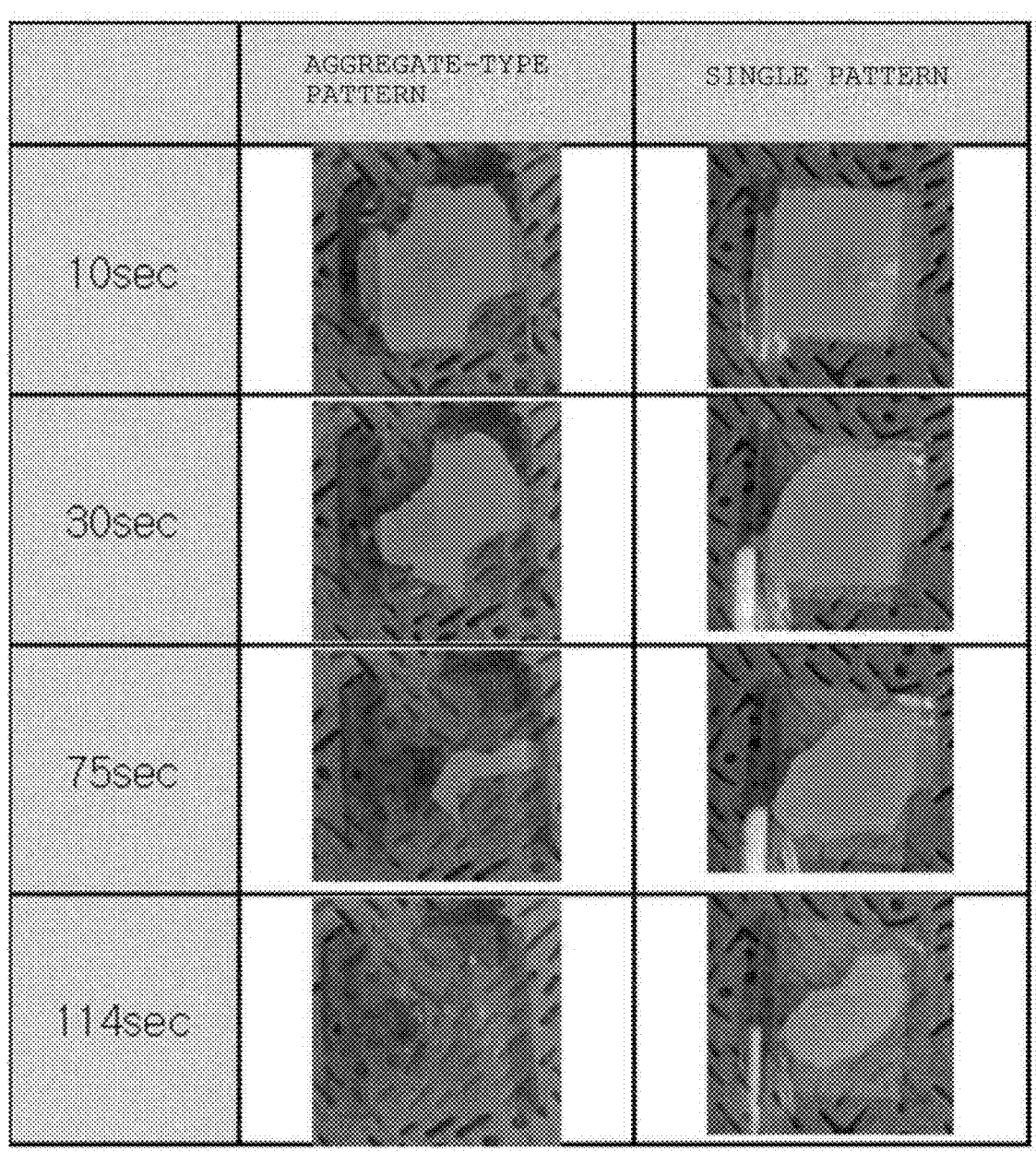

PATTERNED SEPARATOR AND BATTERY COMPRISING SAME

TECHNICAL FIELD

This application claims priority to and the benefit of Korean Patent Application No. 10-2015-0182167 filed in the Korean Intellectual Property Office on Dec. 18, 2015, the entire contents of which are incorporated herein by reference.

The present application relates to a separator and a battery comprising the same.

BACKGROUND ART

The development and evolution of secondary batteries have become a motivation to actively expand mobile devices such as mobile phones, laptop computers, PCs, and portable multimedia players, and as the hybrid electric vehicle (HEV), mobile IT, intelligent robot industry, eco-friendly energy industry, and the like, which are the state-of-the art industries, have been developed, the secondary battery industry, which is an essential part of these industries, is required to be technically developed.

Lithium ion batteries have excellent advantages in capacity, weight, self-discharge, memory effects, and the like compared to existing batteries based on nickel (nickel cadmium batteries and nickel hydrogen batteries), and thus is dominating the whole secondary battery market. Further, due to the advantage, the demand and application field thereof are increasing, and the lithium ion batteries have been usually applied to laptop computers, mobile phones, and the like, which require high capacity and a weight reduction. Currently, the biggest demand of the lithium secondary battery is laptop computers, PCs, mobile phones, and mobile electronic devices, and particularly, even though the lithium secondary battery is intermittently and repetitively charged, the lithium secondary battery can be used without deterioration in performance, so that it is possible to implement the most optimal characteristics for the use of mobile IT or futuristic automobiles.

The core configuration, which constitutes a lithium secondary battery, is a positive electrode, a negative electrode, an electrolyte, and a separator, a polyethylene separator having micro pores is disposed between the positive electrode and the negative electrode, and the lithium secondary battery has a structure in which electricity is generated by an electrical flow in which lithium ions move through the electrolyte between the positive electrode and the negative electrode. The lithium ions move and pass through the separator, which is a porous membrane that blocks the positive electrode from being brought into contact with the negative electrode through the electrolyte. The lithium secondary battery is a battery in which electrodes are bonded to both surfaces of the separator by a binder, and typically, there is a problem in that the binder penetrates the separator in the form of a thin layer having low viscosity, and as a result, ion conductivity deteriorates, and the like. In order to solve the problem, studies have been conducted on the use of a highly viscous binder having high binding strength without penetrating the separator. An additive such as a thickener for increasing the viscosity as described above is added, and the addition of the additive negatively affects the movement of ions through the electrolyte and thus causes the performance of the lithium secondary battery to deteriorate.

Further, a separator for which a porous substrate is widely used has a problem in that the separator exhibits an extreme heat shrinkage at a predetermined temperature due to material characteristics and characteristics in a manufacturing process including a process such as stretching, and thus a positive electrode and a negative electrode are brought into contact with each other. In order to solve the problem, studies have been conducted on a separator in which a coating layer is formed on at least one surface of a porous substrate. However, a binding strength between the electrode and the separator is reduced, and as a result, there may occur a problem in that lithium ions are not effectively transferred and the performance of the lithium secondary battery deteriorates. In addition, a bonding layer formed on an existing separator is formed by a full surface coating method and thus acts as a resistance in the movement of ions and causes the performance of the lithium secondary battery to deteriorate.

DETAILED DESCRIPTION OF THE INVENTION

Technical Problem

An object of the present application is to provide a separator which allows a bonding layer pattern to be easily printed by using a low viscous bonding composition which does not include an additive such as a thickener, and may implement an excellent performance of a secondary battery by solving a problem of a resistance acting inside the secondary battery, which is generated when a bonding layer of the separator is formed by a full surface coating method.

Technical Solution

An exemplary embodiment of the present application provides a separator comprising: a porous substrate; and a first bonding layer pattern provided on at least one surface of the porous substrate, in which each pattern constituting the first bonding layer pattern consists of a second bonding layer pattern having an aperture ratio of 5% or more and 40% or less.

Further, another exemplary embodiment of the present application provides a cliché for gravure printing, the cliché having a groove pattern provided on one surface thereof, in which at least one or more partition walls are comprised inside the groove.

Advantageous Effects

A separator according to an exemplary embodiment of the present application may allow a bonding layer pattern to be easily printed by using a low viscous bonding composition which does not include an additive such as a thickener.

Further, the separator according to an exemplary embodiment of the present application has a characteristic in which a resistance acting inside a secondary battery is lower and a wetting time of an electrolytic solution is faster than when a bonding layer of the separator is formed by a full surface coating method, thereby having an effect in which an excellent performance of the secondary battery may be implemented.

BRIEF DESCRIPTION OF DRAWINGS

FIG. 1 is a view illustrating a cliché for gravure printing, which is used when a pattern is formed by a gravure printing process in Example 1 and Example 4.

FIG. 2 is a view illustrating a cliché for gravure printing, which is used when a pattern is formed by a gravure printing process in Comparative Example 1.

FIG. 3 is a view illustrating a pattern formed by a gravure printing process in Comparative Example 1.

FIG. 4 is a view illustrating a cliché for gravure printing, which is used when a pattern is formed by a gravure printing process in Comparative Example 4.

FIG. 5 is a view illustrating a pattern formed by a gravure printing process in Example 4.

FIG. 6 is a view illustrating a pattern formed by a gravure printing process in Comparative Example 4.

FIG. 7 is a view illustrating a separator in which a bonding layer is not formed in Comparative Example 5.

FIG. 8 is a view illustrating a pattern formed by a gravure printing process in Example 1.

FIG. 9 is a view illustrating a second bonding layer pattern which is any one of the patterns constituting a first bonding layer pattern of FIG. 8.

FIG. 10 is a view illustrating coin cell resistance results measured in Examples 2 and 3 and Comparative Examples 2 and 3.

FIG. 11 is a view illustrating the wetting time according to Example 5 and Comparative Example 6.

FIG. 12 is a view illustrating an example of a hollow second bonding layer pattern.

FIG. 13 is a view schematically illustrating characteristics of a case where a bonding layer pattern is formed on a separator as in an exemplary embodiment of the present application and a case where a bonding layer is fully coated on a separator as in the related art.

FIG. 14 is a view schematically illustrating characteristics of a case where a bonding layer pattern is in the form of aggregate as in an exemplary embodiment of the present application and a case where the bonding layer pattern is not in the form of aggregate, but in the form of a single pattern as in the related art.

FIG. 15 is a view illustrating an electrolytic solution wetting phenomenon for the separators in Example 1 and Comparative Example 1.

BEST MODE FOR CARRYING OUT THE INVENTION

Hereinafter, the present application will be described in more detail.

When one part "comprises" one constituent element in the present specification, unless otherwise specifically described, this does not mean that another constituent element is excluded, but means that another constituent element may be further included.

An exemplary embodiment of the present application provides a separator comprising: a porous substrate; and a first bonding layer pattern provided on at least one surface of the porous substrate, in which each pattern constituting the first bonding layer pattern consists of a second bonding layer pattern having an aperture ratio of 5% or more and 40% or less.

The porous substrate may be a polyolefin-based porous substrate. The porous substrate may be, for example, a membrane-like substrate or a fibrous substrate, which is formed by using polyethylene, polypropylene, and the like either alone or in mixture thereof.

As the porous substrate, it is possible to use, for example, a mixture multilayer separator, such as a two-layer separator of polyethylene/polypropylene, a three-layer separator of polyethylene/polypropylene/polyethylene, and a three-layer separator of polypropylene/polyethylene/polypropylene.

An exemplary embodiment of the present application provides a separator in which the first bonding layer pattern has a total aperture ratio of 20% or more and less than 80%.

The aperture ratio refers to a ratio of a region which is not covered by a pattern.

When a lithium secondary battery is exemplified among batteries, in the lithium secondary battery, a separator is disposed between a positive electrode and a negative electrode, and electricity is generated by an electrical flow in which lithium ions move through the electrolyte between the positive electrode and the negative electrode.

As the aperture ratio, which is a ratio of a region which is not covered by a pattern, is increased, there is an effect in which a channel capable of wetting a separator in an electrolytic solution is widened, and as a result, lithium ions smoothly move. However, when the aperture ratio is increased at a predetermined level or more, there is a problem in that an interfacial bonding strength between an electrode and a separator cannot be secured. Accordingly, it is important to appropriately adjust the aperture ratio for smooth moving lithium ions.

The ion conductivity in the battery is affected by an amount of electrolytic solution wetting the separator, and when a separator into which a bonding layer pattern is introduced according to an exemplary embodiment of the present application is applied to a lithium secondary battery, there is an advantage in that a resistance acting inside the battery can be reduced by adjusting the aperture ratio. Accordingly, a lithium secondary battery adopting a separator into which a bonding layer pattern is introduced according to an exemplary embodiment of the present application has an effect of appropriately increasing an amount of electrolytic solution, and may obtain an effect in which the performance of the battery is better than that of a lithium secondary battery to which a separator into which a fully-coated bonding layer is introduced is applied.

FIG. 1 illustrates a cliché for gravure printing, which is used when a first bonding layer pattern having an aperture ratio of 68% is formed on one surface of a separator, and FIG. 4 illustrates a cliché for gravure printing, which is used when a first bonding layer pattern having an aperture ratio of 80% is formed on one surface of a separator.

According to the aperture ratio, the bonding strengths between the bonding layer pattern and the separator are different from each other, and specifically, the smaller the aperture ratio of pattern is, the more the bonding strength between the bonding layer pattern and the separator may be improved.

In an exemplary embodiment of the present application, the form of each pattern constituting the second bonding layer pattern is characterized by comprising at least one of a circle, an ellipse, and a polygon. The polygon means a figure surrounded by three or more line segments, such as a triangle, a square, a pentagon, and a hexagon. However, the polygon is not limited thereto, and it is possible to apply all the forms which can be in the form of dots, such as a rhombus form and a fan form.

Further, a form of each pattern constituting the second bonding layer pattern may be a wave form, an edge form of a circle, an edge form of an ellipse, an edge form of a triangle, and the like.

In addition, referring to FIG. 12, the form of the second bonding layer pattern may be a hollow form.

In an exemplary embodiment of the present application, each pattern constituting the second bonding layer pattern may have a diameter of 10 µm to 100 µm.

Each pattern constituting the second bonding layer pattern may be collected to form an aggregate. That is, in an exemplary embodiment of the present application, the first bonding layer pattern may consist of a second bonding layer pattern in the form of aggregate. When the bonding layer pattern is in the form of aggregate as in an exemplary embodiment of the present application, the binder is rapidly swollen, and when the bonding layer pattern is not in the form of aggregate, but in the form of a single pattern as in the related art, the binder is slowly swollen. The contents as described above are schematically illustrated in the following FIG. 14.

In an exemplary embodiment of the present application, a gap between patterns constituting the first bonding layer pattern may be disposed by regularly maintaining a predetermined gap.

The gap between patterns constituting the first bonding layer pattern may be 100 µm to 1,000 µm.

However, the gap is not limited thereto, and the gap between patterns constituting the first bonding layer pattern may be irregularly disposed.

An exemplary embodiment of the present application provides a separator having a resistance of 0 ohm and more and 0.65 ohm or less.

The resistance value according to an exemplary embodiment of the present application means a coin cell resistance value.

In an exemplary embodiment of the present application, the second bonding layer pattern is formed from a bonding composition including a binder solution, a solvent, and a surfactant, and the bonding composition has a viscosity of more than 0 cP and less than 30 cP.

An exemplary embodiment of the present application provides a separator in which the bonding composition comprises: 49 wt % to 70 wt % of a binder solution; 29 wt % to 50 wt % of a solvent; and 0.1 wt % to 10 wt % of a surfactant, based on a total weight of the bonding composition.

The binder solution may comprise a binder resin and a solvent.

The binder resin may be an aqueous or oily emulsion type, and the binder solution may include 15 wt % to 40 wt % of a binder and 60 wt % to 85 wt % of water.

Examples of the binder resin included in the binder solution include acrylate-series of methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, stearyl acrylate, methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate and the like, polyvinylidene fluoride series of polyvinylidene fluoride, polyvinylidene fluoride-hexafluoropropylene, polyvinylidene fluoride-trichloroethylene, polyvinylidene fluoride-chlorotrifluoro ethylene and the like.

Further, examples of the solvent included in the binder solution include water; alcohols such as ethanol, methanol, isopropanol, butanol, ethylene glycol, and ethylene glycol monomethyl ether; amides such as N-methylpyrrolidone and N,N-dimethylformamide; ketones such as acetone, ethyl methyl ketone, diisopropyl ketone, cyclohexanone, methylcyclohexane, and ethylcyclohexane; cyclic aliphatic hydrocarbons such as cyclopentane and cyclohexane; aromatic hydrocarbons such as toluene, xylene, and ethylbenzene; and the like.

The solvent included in the bonding composition may include water, and may include one or two or more selected from the group consisting of methanol, ethanol, propanol, and butanol.

Furthermore, the solvent may include: ester-based compounds such as methyl acetate, ethyl acetate, and butyl acetate; ketone-based compounds such as acetone, methyl ethyl ketone, methyl isobutyl ketone, and cyclohexanone; alcohol derivatives such as methyl cellosolve, ethyl cellosolve, and butyl cellosolve; aromatic hydrocarbon-based compounds such as benzole, toluole, and xylol; or aliphatic hydrocarbon-based compounds such as n-hexane and cyclohexane.

The bonding composition is characterized by not including an additive such as a thickener, and an exemplary embodiment of the present application has an advantage in that a pattern of a bonding layer is easily formed even by using a low viscous bonding composition. An additive added to increase the viscosity acts as an element of resistance to ion transfer inside a battery, and there is a problem in that the additive is wetted in an electrolytic solution, and negatively affects the movement of ions of the electrolytic solution, thereby making the performance of the battery deteriorate.

When a bonding layer pattern is formed on one surface or both surfaces of a separator by using the bonding layer composition, the first bonding layer pattern may allow the separator to be efficiently wetted by increasing the contact surface area of the electrolytic solution acting on the separator and allowing the electrolytic solution to smoothly move. Further, the second bonding layer pattern serves to smoothly swell the first bonding layer pattern itself.

Accordingly, an exemplary embodiment of the present application may allow the separator to be smoothly wetted and swollen by forming a bonding layer pattern on the separator, compared to the case where a bonding layer solution is fully coated on the separator, and accordingly, there is an effect capable of obtaining an excellent performance of the battery. When a bonding layer pattern is formed on a separator as in an exemplary embodiment of the present application, the electrolytic solution is easily penetrated, and when a bonding layer is fully coated on a separator as in the related art, it is difficult for the electrolytic solution to be penetrated. The contents as described above are schematically illustrated in the following FIG. 13.

An exemplary embodiment of the present application provides a separator in which a second bonding layer pattern is formed by using a gravure printing method.

The gravure printing method refers to a method performed in the following manner. First, a groove is formed at a specific position of an intaglio or a cliché of a printing substrate corresponding to a pattern to be formed, and then the inside of the groove is filled with ink. The inside of the groove is filled with an ink in a state where gravure ink for forming a pattern is applied to an upper portion of the cliché, and then a doctor blade is brought into contact with the cliché. By the progress of the doctor blade, the inside of the groove is filled with the ink, and simultaneously, the ink in a non-pattern portion remaining on the surface of the cliché is removed.

Further, printing is performed by directly adhering the cliché to an object to be printed in a state where the cliché is filled with the ink.

The aperture ratio of the pattern according to an exemplary embodiment of the present application is adjusted by a method for manufacturing a printing substrate by fixing a diameter of a first bonding layer pattern in a pattern portion of the printing substrate such as the intaglio or the cliché, and adjusting the size and gap of a second bonding layer pattern.

An exemplary embodiment of the present application provides a battery comprising the separator according to an exemplary embodiment of the present application.

The battery includes: a positive electrode; a negative electrode; and a separator interposed between the positive electrode and the negative electrode. The battery may be a lithium battery, but is not limited thereto.

Among the lithium batteries, a lithium secondary battery may be classified into a lithium ion battery, a lithium ion polymer battery, and a lithium polymer battery according to the types of separator and electrolyte used, and may be classified into a cylindrical shape, an angular shape, a coin shape, a pouch shape, and the like according to the shape thereof. Further, the lithium secondary battery may be classified into a bulk type and a thin-film type according to the size thereof.

The lithium secondary battery according to an exemplary embodiment of the present application is not particularly limited in shape.

An exemplary embodiment of the present application provides a cliché for gravure printing, the cliché having a groove pattern provided on one surface thereof, in which at least one or more partition walls are comprised inside the groove.

The partition wall may have a height of 5 μm to 50 μm and a width of 5 μm to 50 μm.

An exemplary embodiment of the present application provides a cliché for gravure printing, the cliché comprising at least two or more partition walls inside the groove, in which a gap between the partition walls is 10 μm to 100 μm.

The partition wall may be in form of a dot, a line, or a mesh.

[Mode for Invention]

Hereinafter, the present specification will be described in detail with reference to Examples for more specifically describing the present specification. However, the Examples according to the present specification may be modified in various forms, and it is not interpreted that the scope of the present specification is limited to the Examples described below in detail. The Examples of the present specification are provided for more completely explaining the present specification to a person with ordinary skill in the art.

EXAMPLES

Example 1

A bonding layer solution including 60 wt % of a PX-LP17 binder solution manufactured by ZEON Corporation, 38 wt % to 39 wt % of ethanol, and 1 wt % to 2 wt % of a WE3475 surfactant manufactured by Basf Corporation was prepared. A first bonding layer pattern was formed on one surface of a prepared polyethylene separator by a gravure printing process. And then, when the gravure printing process was performed, a pattern was formed by using a cliché including at least one or more partition walls.

The first bonding layer pattern was printed so as to have an aggregate shape, and a second bonding layer pattern, which is each pattern constituting the first bonding layer pattern, had a circular shape having a diameter of 35 μm, and the second bonding layer pattern had an aperture ratio of 8%. Further, the first bonding layer pattern had a total aperture ratio of 68%.

FIG. 1 is a view illustrating a cliché for gravure printing, which is used when a pattern is formed by a gravure printing process in Example 1.

FIG. 8 is a view illustrating a pattern formed by a gravure printing process in Example 1. FIG. 9 is a view illustrating a second bonding layer pattern which is any one of the patterns constituting the first bonding layer pattern of FIG. 8.

Example 2

A bonding layer pattern was formed on one surface of a polyethylene separator by using the bonding layer solution prepared in Example 1, a coin cell was assembled to test the performance of the separator, and a coin cell resistance value of the separator was measured.

In order to measure the coin cell resistance value, the separator was first disposed inside a case in the form of a coin, and a coin cell was assembled in the order of a positive electrode, a separator, a spacer, a wave spring, a gasket, and a cover (negative electrode) from the lower portion thereof. Thereafter, the coin cell resistance value of the separator was measured by injecting an electrolytic solution thereinto.

The coin cell resistance value was measured by using an electrochemical analyzer measurement apparatus manufactured by Solatron Co., Ltd.

Example 3

A bonding layer pattern was formed on both surfaces of a polyethylene separator by using the bonding layer solution prepared in Example 1, and a coin cell resistance value of the separator was measured.

Example 4

A first bonding layer pattern having an aperture ratio of 68% in a form of aggregate was formed on one surface of a polyethylene separator by using a gravure printing method, and a bonding strength between the first bonding layer pattern and the separator was measured.

The bonding strength was measured by applying heat to the printed separator at 100° C. at a rate of 1 m/min while allowing printing surfaces to face each other to stack the printed separators at a width of 25 mm, and performing a 180° peel test method.

Referring to FIG. 5, it can be confirmed that the patterns formed by the gravure printing process in Example 4 were regularly disposed at a gap of 500 μm.

FIG. 1 is a view illustrating a cliché for gravure printing, which is used when a pattern is formed by a gravure printing process in Example 4.

Example 5

A bonding layer pattern was formed on both surfaces of a polyethylene separator by a gravure printing method using the bonding layer solution prepared in Example 1, and the wetting time according to the wetting of the electrolytic solution was recorded.

Comparative Example 1

Unlike Example 1, a first bonding layer pattern was formed by using a cliché having no partition wall.

Referring to FIG. 3, it can be confirmed that the patterns formed by a gravure printing process in Comparative Example 1 did not form an aggregate shape and were very irregularly disposed.

FIG. 2 is a view illustrating a cliché for gravure printing, which is used when a pattern is formed by a gravure printing process in Comparative Example 1.

Comparative Example 2

The bonding layer solution prepared in Example 1 was used and fully coated on one surface of a polyethylene separator, and then a coin cell resistance value of the separator was measured.

Comparative Example 3

The bonding layer solution prepared in Example 1 was used and fully coated on both surfaces of a polyethylene separator, and then a coin cell resistance value of the separator was measured.

The coin cell resistance values measured in Examples 2 and 3 and Comparative Examples 2 and 3 are illustrated in FIG. 10.

Comparative Example 4

A first bonding layer pattern having an aperture ratio of 80% in a form of aggregate was formed on one surface of a polyethylene separator by using a gravure printing method, and a bonding strength between the first bonding layer pattern and the separator was measured. The bonding strength was measured by applying heat to the printed separator at 100° C. at a rate of 1 m/min while allowing printing surfaces to face each other to stack the printed separators at a width of 25 mm, and performing a 180° peel test method.

FIG. 4 is a view illustrating a cliché for gravure printing, which is used when a pattern is formed by a gravure printing process in Comparative Example 4.

FIG. 6 is a view illustrating a pattern formed by a gravure printing process in Comparative Example 4.

Comparative Example 5

A bonding strength between a bonding layer and a separator was measured without forming the bonding layer. The bonding strengths of the separators according to Example 4 and Comparative Examples 4 and 5 are shown in Table 1.

FIG. 7 is a view illustrating the separator in which the bonding layer is not formed in Comparative Example 5.

Comparative Example 6

The bonding layer solution prepared in Example 1 was fully coated on both surfaces of a polyethylene separator by bar coating, and the wetting time according to the wetting of the electrolytic solution was recorded.

The wetting was performed by the following method.

The separators according to Example 5 (a pattern was formed on both surfaces of a separator) and Comparative Example 6 (a bonding layer solution was fully coated on both surfaces of a separator) were cut into 2 cm×2 cm, and then the both surfaces of the separators were brought into contact with a polyethylene phthalate (PET) films having the same size, and laminated to the PET films while applying heat at 100° C. at a rate of 1 m/min. And then, the separators were covered with an imide tape, and then wetted by pouring an electrolytic solution thereto. As the electrolytic solution, a propylene carbonate solvent was used. And then, after the wetting, the time taken until the entire surface was wetted was measured by using a stopwatch.

The wetting time according to Example 5 and Comparative Example 6 were measured, and the results are shown in FIG. 11.

When the results of measuring the wetting time of the separator were compared with each other, it can be confirmed that the wetting time of the separator with both surfaces patterned by a gravure printing process was shorter than that of the separator which was fully coated. The shorter wetting time means that the electrode and the separator inside the battery are smoothly wetted, and it is possible to improve the efficiency of performing the process by shortening the wetting time.

The wetting speed is an element which is important for the battery performance when an electrolytic solution is injected into a battery in an assembly process of the battery. If the wetting of the separator is not performed well, and thus the wetting time is elongated, ions are not easily transferred, and as a result, a resistance acts against the battery.

TABLE 1

|  | Bonding Strength (gf/25 mm) |
| --- | --- |
| Example 4 (separator with a first bonding layer pattern having an aperture ratio of 68% and formed on one surface thereof) | 21.19 |
| Comparative Example 4 (separator with a first bonding layer pattern having an aperture ration of 80% and formed on one surface thereof) | 7.32 |
| Comparative Example 5 (separator which is not subjected to a printing process) | 0 |

As can be confirmed in Table 1, it is shown that the bonding strengths between the first bonding layer pattern and the separator are different from each other according to the aperture ratio of the pattern, and the smaller the aperture ratio of the pattern is, the greater the bonding strength of the separator is. Accordingly, the bonding strength can be adjusted according to the aperture ratio of the bonding layer pattern.

The wetting time of the electrolytic solution for the separators according to Example 1 and Comparative Example 1 was measured. More specifically, the wetting time of the electrolytic solution for the separator according to Example 1 was 1 minute and 54 seconds, and the wetting time of the electrolytic solution for the separator according to Comparative Example 1 was 4 minutes and 12 seconds. The electrolytic solution wetting phenomenon for the separators in Example 1 and Comparative Example 1 is illustrated in the following FIG. 15.

As in the results, a separator according to an exemplary embodiment of the present application may allow a bonding layer pattern to be easily printed by using a low viscous bonding composition which does not include an additive such as a thickener.

Further, the separator according to an exemplary embodiment of the present application has a characteristic in which a resistance acting inside a secondary battery is lower and a wetting time of an electrolytic solution is faster than when a bonding layer of the separator is formed by a full surface coating method, thereby having an effect in which excellent performance of the secondary battery may be implemented.

The invention claimed is:

1. A separator comprising:
a porous substrate; and
a first bonding layer pattern provided on at least one surface of the porous substrate,
wherein each pattern constituting the first bonding layer pattern consists of a second bonding layer pattern having an aperture ratio of 5% or more and 40% or less,
wherein the second bonding layer pattern is formed from a bonding composition comprising a binder solution, a solvent, and a surfactant, and
wherein the bonding composition comprises 49 wt % to 70 wt % of a binder solution, 29 wt % to 50 wt % of a solvent, and 0.1 wt % to 10 wt % of a surfactant, based on a total weight of the bonding composition.

2. The separator of claim 1, wherein the first bonding layer pattern has a total aperture ratio of 20% or more and less than 80%.

3. The separator of claim 1, wherein a form of each pattern constituting the second bonding layer pattern comprises at least one of a circle, an ellipse, and a polygon.

4. The separator of claim 1, wherein each pattern constituting the second bonding layer pattern has a diameter of 10 µm to 100 µm.

5. The separator of claim 1, wherein a gap between patterns constituting the first bonding layer pattern is 100 µm to 1,000 µm.

6. The separator of claim 1, wherein the separator has a resistance of 0 ohm and more and 0.65 ohm or less.

7. The separator of claim 1, wherein
the bonding composition has a viscosity of more than 0 cP and less than 30 cP.

8. The separator of claim 1, wherein the second bonding layer pattern is formed by using a gravure printing method.

9. A battery comprising:
a separator, said separator comprising:
a porous substrate; and
a first bonding layer pattern provided on at least one surface of the porous substrate,
wherein each pattern constituting the first bonding layer pattern consists of a second bonding layer pattern having an aperture ratio of 5% or more and 40% or less.

* * * * *